United States Patent Office

3,652,622
Patented Mar. 28, 1972

3,652,622
ORGANICALLY SUBSTITUTED SODIUM ALUMINUM HYDRIDES AND METHOD OF MAKING AND USING THE SAME
Jaroslav Vit, Bohuslav Casensky, and Milan Mamula, Prague, and Jiri Machacek, Rez, Czechoslovakia, assignors to Ceskoslovenska Akademie Ved, Prague, Czechoslovakia
No Drawing. Filed Nov. 10, 1966, Ser. No. 594,971
Claims priority, application Czechoslovakia, Nov. 13, 1965, 6,771/65; Mar. 26, 1966, 2,009/66, 2,010/66
Int. Cl. C01b 6/28; C07f 5/06
U.S. Cl. 260—448 AD                      10 Claims The present invention relates to a method of producing substituted aluminum hydrides, to novel substituted aluminum hydrides and to a method of carrying out reductions and a method of utilizing substituted aluminum hydrides as reducing agents and as catalysts.

More particularly, the present invention is concerned with a method of producing sodium aluminum hydrides which are substituted with organic groups, with novel sodium aluminum hydrides substituted with organic groups, and with a method of carrying out reductions and catalytically favored direct synthesis, utilizing the novel organically substituted aluminum hydrides of the present invention.

Certain organically substituted sodium aluminum hydrides, for instance sodium aluminum ethoxy hydride, methoxy hydride and aryloxy hydrides are known and used as specific reducing agents in organic chemistry. It is possible, for instance, by using these compounds as reducing agents to reduce aldehydes, ketones and organic acid esters and chlorides to alcohols, to reduce nitro-compounds to amines and nitriles to aldehydes. Furthermore, these compounds are useful as dehalogenating agents.

Various processes have been described for producing these compounds.

One of the difficulties encountered in producing these compounds and also in using the same is that they are only soluble in very few organic solvents, for instance in diethyl ether but not in solvents which are more easily available and less dangerous to handle. Thus, for instance, it is not possible to dissolve the above mentioned organically substituted sodium aluminum hydrides in benzene.

This limited solubility creates difficulties and dangers in the production as well as in the use of these known products.

Some other hydrides for instance decaborane are soluble in non-polar media, however, in such solution these hydrides do not possess any reducing properties.

It is therefore an object of the present invention to overcome the above mentioned difficulties and disadvantages.

It is a further object of the present invention to provide a method for producing organically substituted sodium aluminum hydrides which can be carried out in a simple and economical manner.

It is yet another object of the present invention to provide a method for producing organically substituted sodium aluminum hydrides which can be carried out in a non-polar media.

It is still a further object of the present invention to provide organically substituted sodium aluminum hydrides which are soluble in certain organic non-polar media such as benzene, toluene and the like.

It is still another object of the present invention to provide a method of carrying out reducing reactions, utilizing organically substituted sodium aluminum hydrides as the reducing agents, which reactions can be carried out in a non-polar media.

It is an additional object of the present invention to provide a method for the direct synthesis of sodium aluminum hydrides, particularly sodium aluminum tetrahydride and trisodium aluminum hexahydride.

Other objects and advantages of the present invention will become apparent from a further reading of the description and of the appended claims.

With the above and other objects in view, the present invention contemplates a method of producing organically substituted sodium aluminum hydrides of the general formula (I) $\quad NaAlH_xZ_{4-x}$ wherein $x$ is an integral number between 1 and 2 inclusive and Z is selected from the group consisting of Q and Y, wherein Y is selected from the group consisting of methoxyl, ethoxyl and propoxyl, and wherein Q is an organic radical, derived by splitting off an active hydrogen atom from a compound selected from the group consisting of:

(1) Tetrahydrofurfuryl alcohols,
(2) Tetrahydropyranyl alcohols,
(3) Ether alcohols of the type obtainable by alkylating one hydroxyl group in diols or two hydroxyl groups in triols.
(4) Polyether alcohols of the type obtainable by dehydration of ether alcohols and diols or by dehydration of tetrahydrofurfuryl alcohols and diols, or by dehydration of tetrahydropyranyl alcohols and diols,
(5) The compounds of groups (1)–(4), wherein at least one oxygen atom is replaced by a sulphur atom,
(6) An amino alcohol of the general formula $$R''R'''N(CH_2)_zOH$$

wherein $R''$ and $R'''$ are each selected from the group consisting of alkoxyalkyl of the formula $R'O(CH_2)_z$ and $R'$, and wherein $R'$ is selected from the group consisting of alkyl with 1–4 carbon atoms and aryl with 6–8 carbon atoms, and wherein $z$ is an integral number between 2 and 4 inclusive, comprising the step of reacting at least one substance selected from the group consisting of $Na_3AlH_6$ and $NaAlH_4$ with a compound of the general formula $AlZ_3$, wherein Z has the same meaning as defined above.

The term "propoxyl" is meant to denote not only normal propoxyl but also isopropoxyl.

$Na_3AlH_6$ may be prepared for instance by the method described in Czechoslovak Pat. No. 117,768.

Compounds of the general formula $AlZ_3$ and also of the general formula $NaZ$ which may be also used as a supplementary reactant as will be described in detail further below, may be prepared by the reaction of the respective alcohol with the metal, i.e., with sodium or aluminum, or with the respective hydride, i.e., sodium hydride or aluminum hydride. There is no difficulty involved in preparing the thioalkoxy, dialkylamino and alkylamino substituted derivatives. In the case of the preparation of the thioalcoholates of the type NaZ and $AlZ_3$, however, it is recommended to start from the more reactive hydrides NaH and $AlH_3$ instead of the metals. The reactions, generally, may be carried out in liquid media such as hydrocarbons, ethers (diethylether, monoglyme, tetrahydrofurane) using an excess on the ZH compounds.

The thus formed NaZ compounds are insoluble in the reaction medium and thus will be formed as a suspension.

Prior to being used in the above described process of the present invention which may be carried out for instance as described in Equations 7–13 and 15–19 below, the NaZ compounds must be separated from the suspension preferably by filtration and subsequent drying. The thus obtained dry product may be used directly as a starting material for the method of the present invention. It does not require any further purification. The impurities which might be present such as metallic sodium do not interfere with the reaction since these impurities are insoluble in the reaction medium, whereas the finished products obtained by the method of the present invention will be soluble in the respective reaction medium. However, if the compound of the type NaZ has been made by using NaH as starting material and therefore the thus produced NaZ may contain residual NaH it might be desirable in certain cases to increase in the method according to the present invention the amount of the sodium aluminum hydride and of $AlZ_3$ above the theoretically required amount.

The preparation of alcoholates, aminoalcoholates, and thioalcoholates of the type $AlQ_3$ is equally simple. Conventional methods may be used in the preparation of all derivatives, starting from the aluminum or aluminum hydride, and the respective alcohol, aminoalcohol or thioalcohol of the formula QH, the later being easily removed from the product $AlQ_3$ when stripping off the solvent; subsequently, the product $AlQ_3$ is dried in vacuo. The above sodium aluminum hydrides, substituted according to this invention are all soluble in hydrocarbons and ethers; thus unaltered aluminum or aluminum hydride can be easily removed by filtration prior to the actual isolation of the final product. The thioalkoxy-derivatives, however, having a S—Al bond in their molecule, are distinguished by somewhat lower solubility.

Another very advantageous method of producing aluminum alcoholates and thioalcoholates of the type $AlQ_3$ is based on the following equilibrium reaction:

(1)     $Al(OCH_3)_3 + 3QH \rightarrow AlQ_3 + 3CH_3OH$
(2)     $Al(OR)_3 + 3QH \rightarrow AlQ_3 + 3ROH$ It is advisable to use an excess of QH and to carry out the reaction under simultaneous removal of $CH_3OH$ (or ROH), the boiling point of which must be lower than that of QH, which usually will be the case. The stripping off of the $CH_3OH$ (ROH) may be conveniently carried out by using a rectification column.

The starting aluminum alcoholates to carry out the reaction are easily accessible in a pure state, even on an industrial scale. To start from $Al(OCH_3)_3$ seems to be most advantageous since the same is insoluble, e.g., in hydrocarbons, thus facilitating the separation of any unaltered portion thereof from the reaction mixture. The product $AlQ_3$ may be isolated by simply stripping off the solvent and the excess of QH.

The starting compound of the type $NaZ.AlZ_3$ may be prepared by the reactions accounted for as below:

(3)     $Na + Al + 4QH \rightarrow NaAlQ_4 + 2H_2$
(4)     $NaH + AlH_3 + 4QH \rightarrow NaAlQ_4 + 4H_2$
(5)     $NaAlH_4 + 4QH \rightarrow NaAlQ_4 + 4H_2$
(6)     $NaAl(OCH_3)_4 + 4QH \rightarrow NaAlQ_4 + 4CH_3OH$ The complex alcoholates of the type $NaZ.AlZ_3$ are generally easily soluble in ethers and the $NaQ.AlQ_3$ alcoholates even in aromatic hydrocarbons. Thus, they may be easily prepared according to the equations given above under the same conditions as when starting from simple alcoholates of the type $NaZ + AlZ_3$.

The method of the present invention may be carried out in accordance with the following equations:

(7)     $Na_3AlH_6 + 3NaZ + 5AlZ_3 \rightarrow 6NaAlHZ_3$
(8)     $Na_3AlH_6 + 2AlZ_3 \rightarrow 3NaAlH_2Z_2$
(9)     $3Na_3AlH_6 + 2AlZ_3 + AlCl_3 \rightarrow 6NaAlH_3Z + 3NaCl$
(10)    $NaAlH_4 + 3AlZ_3 + 3NaZ \rightarrow 4NaAlHZ_3$
(11)    $NaAlH_4 + AlZ_3 + NaZ \rightarrow 2NaAlH_2Z_2$
(12)    $NaAlH_4 + 2NaH + 2AlZ_3 \rightarrow 3NaAlH_2Z_2$ In a similar manner complex compounds of the general formula $NaZ.AlZ_3$ may be used instead of $AlZ_3$, for instance in accordance with the equations 15–17 further below.

It is general known that sodium alcoholates and aluminum alcoholates react to yield complex alcoholates according to the following equation:

(13)     $NaOX + Al(OX)_3 \rightarrow NaOX.Al(OX)_3$ wherein X is an alkyl or an aryl. The only condition for carrying out this reaction is that of solubility. $Al(OX)_3$ and the product $NaAl(OX)_4$ must be soluble in the solvents used. The alcoholates of the type $AlQ_3$ and $NaQ.AlQ_3$ are generally more easily soluble in ethers and in aromatic hydrocarbons than the alcoholates of the type $Na(OX).Al(OX)_3$, wherein X is the same as mentioned above and they always result as an intermedial product of the reactions 7 to 13. If the complex alcoholates of the type $NaZ.AlZ_3$ are used as the starting product according to our invention the respective reactions are accounted for by the following equations:

(14)    $Na_3AlH_6 + 3[NaZ.AlZ_3] + 2AlZ_3 \rightarrow 6NaAlHZ_3$
(15)    $NaAlH_4 + 3[NaZ.AlZ_3] \rightarrow 4NaAlHZ_3$
(16)    $NaAlH_4 + NaZ.AlZ_3 \rightarrow 2NaAlH_2Z_2$
(17)    $NaAlH_4 + 3[NaZ.AlZ_3] + 2NaH + 2AlZ_3 \rightarrow 6NaAlHZ_3$ The liquid reaction medium on which the above described reactions of the present invention are carried out is preferably selected from the group consisting of hydrocarbons and ethers which at atmospheric pressure have a boiling point lower than the decomposition temperature of the substituted sodium aluminum hydride which is to be produced.

One suitable manner of carrying out the reaction is under reflux at substantially the boiling temperature of the reaction mixture. The liquid reaction medium preferred is benzene or toluene but, however, any of the liquid reaction media described above may be used.

The novel hydrides of the present invention are compounds of the general formula:

$$NaAlH_xQ_{4-x}$$

wherein $x$ stands for an integral number between 1 and 2 inclusive, and wherein Q is an organic rest derived by splitting off an active hydrogen atom from one of the following compounds in which $x$ has the same meaning as above:

(1) Tetarhydrofurfuryl alcohols, so as to form, for instance,

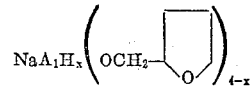

(2) Tetrahydropyranyl alcohols, so as to form, for instance,

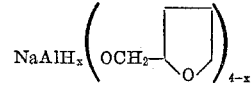

(3) Ether alcohols formed for instance by alkylating one hydroxyl group in diols so as to form, for instance,

$$NaAlH_x[O(CH_2)_zOR']_{4-x}$$

or two hydroxyl groups in triols, so as to form, for instance,

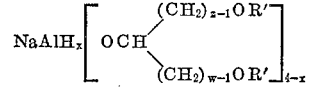

wherein R' is an organic rest selected from the group consisting of alkyl with 1–4 carbon atoms and aryl with 6–8 carbon atoms, and $z$ and $w$ are each an integral number between 2–4 inclusive, and $z$ and $w$ may be the same or different.

(4) Polyether alcohols obtained by dehydration of ether alcohols and diols, so as to form $$NaAlH_x[O(CH_2)_zO(CH_2)_wOR']_{4-x}$$

wherein R' has the same meaning as above and w and z are each integral numbers between 2 and 4 inclusive.

(5) Polyether alcohols obtained by dehydration of tetrahydrofurfuryl alcohols and diols, so as to form

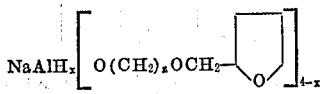

wherein z has the same meaning as above.

(6) Polyether alcohols obtained by the dehydration of tetrahydropyranyl alcohols and diols, so as to form

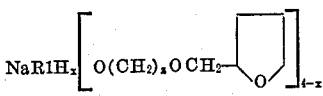

wherein z has the same meaning as above.

(7) Any of the compounds described in numbered paragraphs 1–6 above, in which one or more or all oxygen atoms are replaced by sulphur atoms, so as to form $$NaAlH_x[S(CH_2)_zSR]_{4-x}$$

or $$NaAlH_x[S(CH_2)_zOR]_{4-x}$$

or $$NaAlH_x[O(CH_2)_zSR]_{4-x}$$

wherein R is alkoxyalkyl of the formula $R'O(CH_2)_z$, or R', and wherein R' has the same meaning as above.

(8) An amino alcohol of the general formula $$R''R'''N(CH_2)_zOH$$

wherein R'' and R''' each have the same meaning as R and R'' and R''' may be identical or different, so as to form $$NaAlH_x[O(CH_2)_zNR''R''']_{4-x}$$

wherein z, R'' and R''' have the same meaning as above.

The sulphur-containing compounds including the organic rest described as Q above may be such that all oxygen atoms are replaced by sulphur or, may contain sulphur as well as oxygen atoms.

Groups of compounds which fall within the scope of the present invention include:

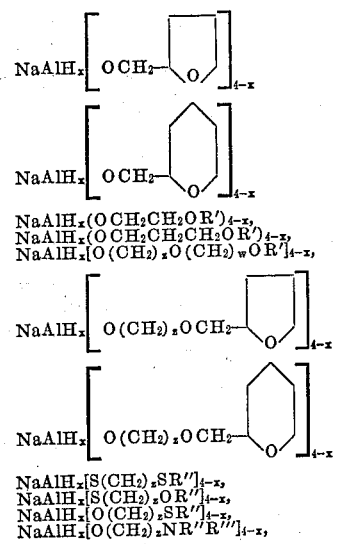

wherein w is an integral number between 2 and 4 inclusive and x, z, R', R'' and R''' have the same meaning as described above.

More specifically, but not by way of limitation, the compounds of the present invention include:

NaAlH₂[O(CH₂)₂OCH₃]₂
NaAlH₂[O(CH₂)₂OC₂H₅]₂
NaAlH₂[O(CH₂)₃OCH₃]₂
NalH₂[O(CH₂)₃OC₂H₅]₂

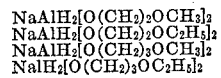

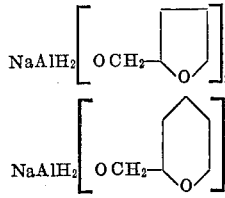

NaAlH₂[O(CH₂)₂N(CH₃)₂]₂
NaAlH₂[O(CH₂)₂N(C₂H₅)₂]₂
NaAlH₂[O(CH₂)₂N(CH₂CH₂OCH₃)₂]₂

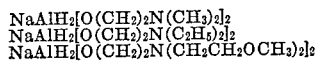

NaAlH₂[O(CH₂)₂O(CH₂)₂OCH₃]₂
NaAlH[O(CH₂)₂OCH₃]₃
NaAlH[O(CH₂)₂OC₂H₅]₃
NaAlH[O(CH₂)₃OCH₃]₃
NaAlH[O(CH₂)₃OC₂H₅]₃

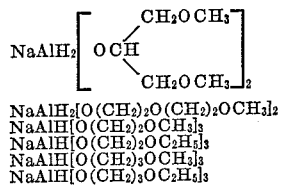

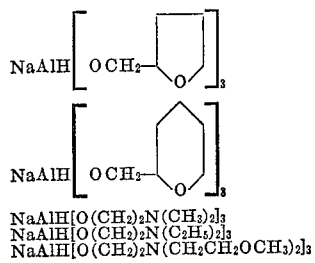

NaAlH[O(CH₂)₂N(CH₃)₂]₃
NaAlH[O(CH₂)₂N(C₂H₅)₂]₃
NaAlH[O(CH₂)₂N(CH₂CH₂OCH₃)₂]₃

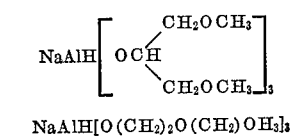

NaAlH[O(CH₂)₂O(CH₂)OH₃]₃

It is also within the scope of the present invention to provide a method of producing at least one sodium aluminum hydride selected from the group consisting of NaAlH₄ and Na₃AlH₆, comprising the step of reacting metallic sodium and metallic aluminum with hydrogen preferably at an elevated hydrogen gas pressure and at an elevated temperature in the presence of a substituted sodium aluminum hydride as defined hereinbefore.

According to a further variation, the present invention is also concerned with carrying out reducing and dehalogenizing reactions by reacting a reducible organic compound such as an aldehyde, ketone, ester, carboxylic acid, halide of carboxylic acid, dialkyl amides, diaryl amides and aromatic nitro compound, or with a halide which may be an organic or inorganic mono- or polyhalide also including substituted halides such as silicon alkyl or aryl halides for instance of the general formula $R_{4-x}SiX_x$, wherein R is alkyl or aryl and X is a halogen.

The substituted sodium aluminum hydrides of the present invention may thus be used as reducing agents soluble in non-polar media and as catalysts for the direct synthesis of complex sodium aluminum hydrides from free elements, i.e., from sodium, aluminum and hydrogen.

These substituted complex sodium aluminum hydrides will reduce in non-polar media, e.g., in benzene, the derivatives of organic acids, ketones and aldehydes to alcohols in the same way and to the same extent as it would be possible with non-substituted complex aluminum hydrides in ethers. In contradistinction to the properties of the known complex aluminum hydrides, they will even dehalogenate the alkyl and aryl halides, and they will reduce the nitro derivatives to azo-compounds. All the aforementioned reactions will proceed in ethers as well as in non-polar media.

The following examples are given as illustrative without, however, limiting the invention to the specific details of the examples.

EXAMPLE I

An apparatus as described in Example II was charged with 2.1 g. of an 80% solution of $Na_3AlH_6$ (0.0164 mol) and 50 ml. of benzene. The mixture was refluxed under dropwise addition of 8.27 g. of $Al(OCH_2CH_2OCH_3)_3$ [0.0328 mol] dissolved in 10 ml. of benzene. The reaction mixture was kept boiling under stirring for an additional 30 minutes. Upon subsequent filtration, and evaporation of the solvent, 9.36 of $NaAlH_2(OCH_2CH_2OCH_3)_2$ was obtained, i.e., 94.1% of the theory.

The starting compound $Al[OCH_2CH_2OCH_3]_3$ was prepared by the following reaction:

$Al(OCH_3)_3 + 3CH_3OCH_2CH_2OH \rightarrow$
$\qquad Al[OCH_2CH_2OCH_3]_3 + 3CH_3OH$ The above reaction was carried out with a 160% excess on $CH_3OCH_2CH_2OH$. (Instead of using an excess on $CH_3OCH_2CH_2OH$, the theoretically required amount may be used and the excess of this compound replaced with another solvent, preferably benzene or toluene.) The methyl alcohol evolved was distilled off from the reaction mixture during the reaction, using a rectification column. Subsequently to stripping off the methyl alcohol, the excess of $CH_3OCH_2CH_2OH$ was stripped off under vacuum. The product of the reaction is a liquid highly viscous compound of the formula $Al(OCH_2CH_2OCH_3)_3$, intermiscible with benzene, toluene, and ethers in any ratio.

EXAMPLE II

Into a three-necked round-bottom flask of 100 ml. volume, provided with a stirrer, a reflux water-condenser and dropping funnel, 1.7 g. of $Na_3AlH_6$ of 85% purity was charged (the remaining 15% consisting of aluminum and silicon), and 35 ml. of tetrahydrofurane was added. The mixture was heated to boiling and a solution of 8.26 g. $Al[O.CH_2CH_2N(CH_3)_2]_3$ in 15 ml. tetrahydrofurane was added dropwise under stirring. The heating was discontinued after 45 minutes and the mixture was cooled to 15° C. Subsequent to filtration, the tetrahydrofurane was stripped off from the filtrate, and the thus obtained residue was dried at 100° C. at a pressure of 0.1 mm. Hg; 9.1 g. of a compound of the formula $NaAlH_2[O.CH_2CH_2N(CH_3)_2]_2$ was obtained, i.e., 93.5% of the theory according to Equation 8. The $(CH_3)_2NCH_2CH_2OH$ required for preparation of $Al[OCH_2CH_2N(CH_3)_2]_3$ was prepared by a reaction which is well known in the methylation of primary amines to convert the latter into tertiary amines, starting with $H_2NCH_2CH_2OH$, formaldehyde and formic acid. The starting $Al[OCH_2CH_2N(CH_3)_2]_3$ was prepared from aluminum methylate in a manner similar to that described in Example I, with respect to the preparation of $Al(OCH_2CH_2OCH_3)_3$.

EXAMPLE III

Into a 2.5 l. pressure vessel, 46 g. of sodium (2 moles), 32.9 g. of aluminum powder of 82% purity (the balance up to 100% consisting of aluminum oxide), 50.5 g. of $NaAlH_2(OCH_2CH_2OCH_3)_2$ (0.25 mole), and 500 ml. of benzene was added and a stirring bar inserted into the pressure vessel for stirring of the reaction mixture. Hydrogen was fed into the vessel to establish a pressure of 100 atoms. The reaction was then carried out at a temperature of 170° C. for a period of 3 hours. The reaction mixture was filtered and the solid residue extracted with benzene; 55.4 g. of solid $Na_3AlH_6$ was obtained of 88.5% purity, i.e., 96.1% of the theory. The benzene filtrate contained dissolved sodium aluminum alkoxyhydrides which were being used as catalyst in the following synthesis.

EXAMPLE IV

The direct synthesis of both sodium aluminum hydrides $NaAlH_4$ and $Na_3AlH_6$ proceeds similarly even if other compounds of the type $NaAlH_xQ_{4-x}$, e.g., $NaAlH[O(CH_2)_2OCH_3]_3$

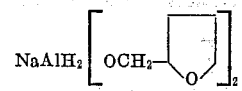

or $NaAlH_2[O(CH_2)_2N(CH_3)_2]_2$ are used as a catalyst; the sulphur compounds, however, being less suitable than the other compounds of the formula $NaAlH_xQ_{4-x}$. The pressure of hydrogen applied may be in a very broad range from 2 to 200 atmospheres. At pressures lower than 2 atmospheres, however, the reaction is too slow; increasing the pressure above 200 atmospheres does not influence the reaction rate substantially, thus a further increasing of the pressure above 200 atmospheres is not practical. The quantity of the catalyst applied can vary in the range from 0.5 to 100% in respect to the amount of sodium and aluminum used. In the specific Example III and Example IV, about 50% of the catalyst was used. Smaller amounts of the catalyst, below 0.5% result in decreasing of the reaction rate.

Using a greater amount of catalysts is of no inconvenience as the catalyst may easily be recycled.

It is advisable to mill the reaction mixture thoroughly prior to the actual synthesis.

EXAMPLE V

Into a 1 liter three-necked vessel, provided with a stirrer, a water cooler, and dropping funnel were charged: 2.75 g. $NaAlH_4[98.2\%]$, 200 ml. benzene, and 8 g.

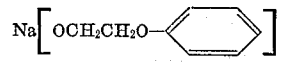

The reaction mixture was refluxed under dropwise addition of a solution of 21.9 g.

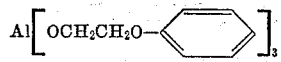

in 50 ml. of benzene, across a period of 30 minutes, and the reaction mixture was refluxed for an additional 4 hours. Subsequently to cooling to 15° C. and to filtration, the filtration cake was washed with benzene. enzene was stripped off from the collected filtrates and the distillation residue was dried at 100° C. and 0.1 mm. Hg. The yield was 32 g. of

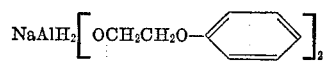

which corresponds to 98.16% of the theory.

The starting compound of the formula

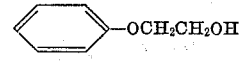

was prepared in toluene by the well known reaction accounted for by the following equations

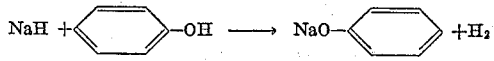

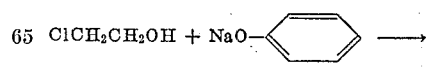

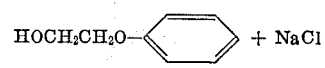

The starting

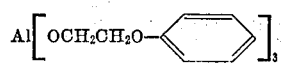

was prepared from aluminum methylate by reactions similar to those described in Example I. The alcoholate NaOCH₂CH₂O— 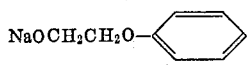

was prepared in a refluxing mixture of toluene, sodium hydride and

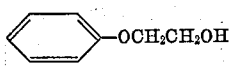—OCH₂CH₂OH in a 20% excess. The toluene and the excessive ether alcohol were stripped off in vacuo and the remaining portions of the said compounds were distilled off at 0.05 mm. Hg and 160° C.

EXAMPLE VI

The same apparatus as in Example V was charged with 5.6 g. Na₃AlH₆ [91.1%], 500 ml. benzene, and 26.1 g.

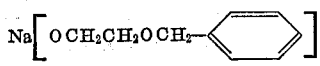

The reaction mixture was refluxed under dropwise addition of a solution of 120 g.

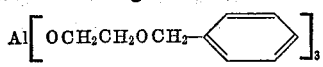

in 200 ml. benzene across a period of 30 minutes. The reaction mixture upon treatment as described in Example V yielded 147.2 g.

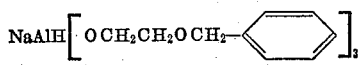

i.e., 97.36% of the theory.
To prepare

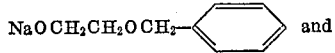 and

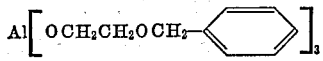

use was made of the same methods as described in Example V.

EXAMPLE VII

The same apparatus as in Example V was charged with 2.75 g. NaAlH₄ [98.2%], 2.5 g. NaH [96.0%] and 150 ml. toluene. The reaction mixture was refluxed under dropwise addition of a solution of 29.4 g.

Al(OCH₂CH₂CH₂OCH₃)₃ in 50 ml. toluene across a period of 45 minutes. Upon treatment of the reaction mixture in the manner described in Example V, 34.0 g. of NaAlH₂(OCH₂CH₂CH₂OCH₃)₂ was obtained, corresponding to 98.57% of theoretical yield.

The necessary CH₃OCH₂CH₂CH₂OH required for preparation of Al(OCH₂CH₂CH₂OCH₃)₃ was prepared by the methylation of one hydroxyl group in 1,3-propanediol, using sodium hydride and (CH₃O)₂SO₂. The latter reaction was carried out in boiling toluene. The starting Al[OCH₂CH₂CH₂OCH₃]₃ was prepared from aluminum methylate in the same manner as described in Example I.

EXAMPLE VIII

Into the same apparatus as described in Example V, were charged: 2.75 g. of NaAlH₄ [98.2%], 26.1 g. of

and 500 ml. of benzene. The reaction mixture was refluxed under simultaneous dropwise addition of a solution of 72 g.

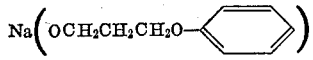

in 150 ml. benzene, across a period of 45 minutes. Treatment of the reaction similar to that described in Example V gave 99.51 g.

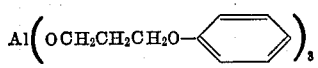

i.e., 98.72% of the theory.

In the preparation of the starting compound use was made of the same method as described in Example V.

EXAMPLE IX

The same apparatus as in Example V was charged with 5.6 g. Na₃AlH₆ [91.1%] and 250 ml. benzene. The reaction mixture was refluxed under dropwise addition of a solution of 38.4 g. Al(OCH₂CH₂OCH₂CH₂OCH₃)₃ in 80 ml. benzene. Further treating of the reaction mixture as described in Example V yielded 42 g.

NaAlH₂(OCH₂CH₂OCH₂CH₂OCH₃)₂ which responds to 96.55% of the theory.

The alcoholates Al(OCH₂CH₂OCH₂CH₂OCH₃)₃ was prepared from CH₃OCH₂CH₂OCH₂CH₂OH by the method described in Example I.

EXAMPLE X

Into the same apparatus as used according to Example V, were charged: 2.75 g. NaAlH₄ and 100 ml. benzene. The reaction mixture was refluxed under dropwise addition of a solution of 41.5 g.

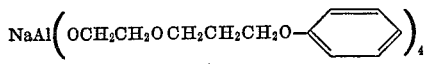

in 150 ml. benzene. The same treatment of the reaction mixture as in Example V gave 43.2 g.

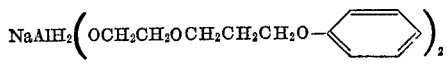

which is 97.74% of the theory.
The

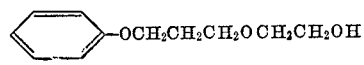

required for preparation of

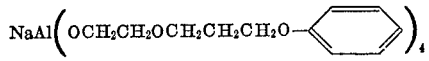

was prepared in the following manner: The sodium phenolate was alkylated in boiling toluene with HOCH₂CH₂CH₂Cl

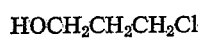

resulting from the reaction was isolated and converted by reaction with sodium hydride in boiling toluene into its alcoholate and the latter was alkylated with HOCH₂CH₂Cl giving a compound of the formula

The starting complex alcoholate was prepared in the apparatus described in Example V in accordance with the following equation:

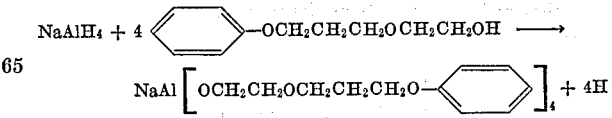

The alcohol was added dropwise to a 5% solution of sodium aluminum tetrahydride in tetrahydrofurane in the stoichiometrically required amount.

The reaction proceeded quantitatively under considerable evolution of heat and of hydrogen. After the evolution of hydrogen had stopped, tetrahydrofurane was distilled off and the product stripped off from the residues of tetrahydrofurane at 0.1 mm. Hg and 100° C.

EXAMPLE XI

The same apparatus as described in Example V was charged with 5.6 g. Na$_3$AlH$_6$(91.1%), 27.6 g.

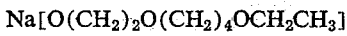
Na[O(CH$_2$)$_2$O(CH$_2$)$_4$OCH$_2$CH$_3$]

and 600 ml. benzene. The reaction mixture was refluxed under dropwise addition of a solution of 127.6 g.

Al[O(CH$_2$)$_2$O(CH$_2$)$_4$OCH$_2$CH$_3$]$_3$ in 250 ml. across 45 minutes. Upon treatment of the reaction mixture as described in Example V, 154.0 g. of

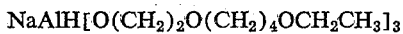
NaAlH[O(CH$_2$)$_2$O(CH$_2$)$_4$OCH$_2$CH$_3$]$_3$ was obtained, which corresponds to 96.13% of the theoretical yield.

The alcohol of the formula

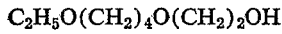
C$_2$H$_5$O(CH$_2$)$_4$O(CH$_2$)$_2$OH required for preparation of the starting alcoholate was prepared from 1,4-butanediol by converting one of the hydroxyl groups into alcoholate by reaction with sodium hydride in boiling toluene and subsequent alkylation with C$_2$H$_5$Br. The product obtained, i.e.,

C$_2$H$_5$O(CH$_2$)$_4$OH was reconverted into the alcoholate form by reaction with sodium hydride in boiling toluene with

C$_2$H$_5$O(CH$_2$)$_4$ONa subsequently alkylated with ClCH$_2$CH$_2$OH, giving

C$_2$H$_5$O(CH$_2$)$_4$O(CH$_2$)$_2$OH

The starting alcoholate of the formula

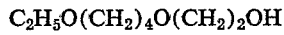
Al[O(CH$_2$)$_2$O(CH$_2$)$_4$OC$_2$H$_5$]$_3$ was prepared from aluminum methylate and

C$_2$H$_5$O(CH$_2$)$_4$O(CH$_2$)$_2$OH in the same manner as described in Example I. The compound of the formula NaO(CH$_2$)$_2$O(CH$_2$)$_4$OC$_2$H$_5$ was prepared by the reaction of sodium hydride with

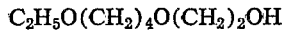
C$_2$H$_5$O(CH$_2$)$_4$O(CH$_2$)$_2$OH in the same manner as described in Example V.

EXAMPLE XII

The same apparatus as described in Example V was charged with 2.75 g. of NaAlH$_4$ (98.2%), 2.5 g. NaH (96.0%), and 300 ml. toluene. The reaction mixture was refluxed under dropwise addition of a solution of 46.25 g.

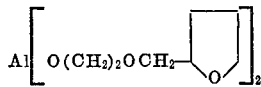

in 100 ml. toluene. Upon treatment of the reaction mixture as described in Example V, 50 g. of

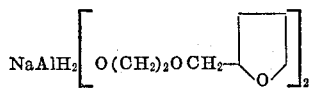

was obtained, i.e., 97.4% of the theory.

The

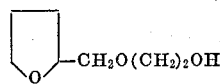

required for preparation of

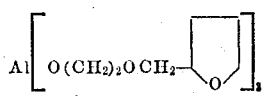

was prepared from

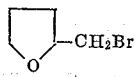

and NaOCH$_2$CH$_2$OH in boiling toluene by the method described in Example V. The starting

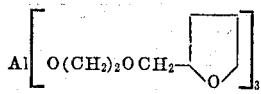

was prepared by the method described in Example I.

EXAMPLE XIII

The same apparatus as described in Example V was charged with 5.6 g. Na$_3$AlH$_6$ (91.1%) and 250 ml. tetrahydrofurane. The reaction mixture was refluxed under dropwise addition of a solution of 22.3 g.

Al[OC$_2$H$_4$N(C$_2$H$_5$)$_2$]$_3$ in 80 ml. tetrahydrofurane for a period of 45 minutes. Upon treatment of the reaction mixture as described in Example V, 26.71 g.

NaAlH$_2$[OC$_2$H$_4$N(C$_2$H$_5$)$_2$]$_2$ was obtained i.e., 97% of the theory.

The starting alcoholate

Al[OCH$_2$CH$_2$N(C$_2$H$_5$)$_2$]$_3$ was prepared from aluminum methylate and (C$_2$H$_5$)$_2$NCH$_2$CH$_2$OH by the method of Example I.

EXAMPLE XIV

The same apparatus as described in Example V was charged with 5.6 g. Na$_3$AlH$_6$ (91.1%), 19.2 g.

Na[O(CH$_2$)$_2$SC$_2$H$_5$]

and 450 ml. toluene. The reaction mixture was refluxed under dropwise addition of a solution of 85.5 g.

Al[O(CH$_2$)$_2$SC$_2$H$_5$]$_3$ in 150 ml. toluene for a period of 40 minutes. Upon treatment of the reaction mixture as described in Example V, 106 g. NaAlH[O(CH$_2$)$_2$SC$_2$H$_5$]$_3$ was obtained, i.e., 96.54% of the theoretical yield.

For preparation of the starting reactants, first a thioether alcohol was prepared from HOCH$_2$CH$_2$Br and C$_2$H$_5$SNa in boiling xylene. The C$_2$H$_5$SCH$_2$CH$_2$OH obtained was converted into its sodium alcoholate NaOCH$_2$CH$_2$SC$_2$H$_5$ by the method of Example V and into its respective aluminate Al(OCH$_2$CH$_2$SC$_2$H$_5$)$_3$ by the method described in Example I.

EXAMPLE XV

The same apparatus as described in Example V was charged with 5.6 g. Na$_3$AlH$_6$ (91.1%) and 350 ml. benzene. The reaction mixture was refluxed under dropwise addition of a solution of 59.5 g.

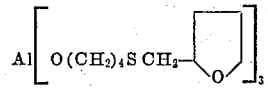

in 100 ml. benzene for a period of 45 minutes. Upon treatment of the reaction mixture as described in Example V, 62 g.

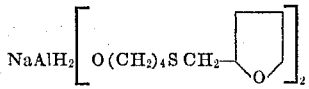

which corresponds to 96.14% of the theory were obtained.

In preparation of the starting material

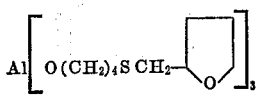

first the compound of the formula

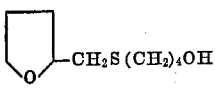

was prepared from

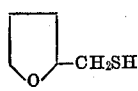

by conversion of the latter into

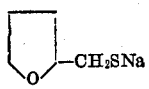

using sodium hydride in boiling toluene. The subsequent operation was alkylation of the mercaptide formed, i.e., of the mercaptide

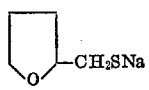

with $HO(CH_2)_4Br$. The thereby obtained product

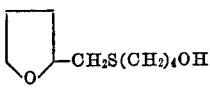

was converted into sodium alcoholate

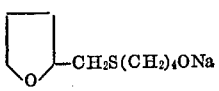

by the method of Example I.

EXAMPLE XVI

The same apparatus as described in Example V was charged with 5.6 g. $Na_3AlH_6$ (91.1%) and 250 ml. toluene. Under refluxing the reaction mixture, 34.2 g. $Al[SC_2H_4OC_2H_5]_3$ dissolved in 100 ml. tetrahydrofurane was added dropwise over a period of 45 minutes. Upon treatment of the reaction mixture as described in Example V, 38.6 g. $NaAlH[SC_2H_4OC_2H_5]_2$ was obtained, i.e., 98.22% of the theory.

The required mercaptane $C_2H_5OC_2H_4SH$ was prepared by conventional synthetic methods from $$CH_3CH_2OCH_2CH_2Cl$$

via a thiouronian salt. The aluminium mercaptide was prepared from the mercaptane obtained, by the reaction with aluminum hydride in tetrahydrofurane in a solution containing stoichiometric ratios of the reactants.

The solution obtained was subsequently anlyzed and, upon adjustment of concentration, used directly in the above preparation of $NaAlH_2[SC_2H_4OC_2H_5]_2$.

EXAMPLE XVII

The same apparatus ase described in Example V was charged with 5.6 g. $Na_3AlH_6$ (91.1%) and 250 ml. benzene. Under refluxing of the reaction mixture 34.8 g. $Al[SC_2H_4SCH_3]_3$ dissolved in 100 ml. tetrahydrofurane was added dropwise over a period of 45 minutes. Upon treatment of the reaction mixture as described in Example V, 38 g. $NaAlH_2[SC_2H_4SCH_3]_2$ was obtained, i.e. 95.24% of the theory.

The mercaptans $CH_3SCH_2CH_2SH$ was prepared by conventional methylation of one SH group in $HSCH_2CH_2SH$. The $HSCH_2CH_2SH$ was converted to $HSCH_2CH_2SNa$ by the reaction with sodium hydride in boiling toluene and the mercaptide was subsequently treated under reflux with $(CH_3O)_2SO_2$, added in a molar ratio of 1:1. The aluminum mercaptide was prepared in the same way as described in Example XVII.

EXAMPLE XVIII

The same apparatus as described in Example V was charged with 5.6 g. $Na_3AlH_6$ (91.1%) and 150 ml. tetrahydrofurane. Under refluxing of the reaction mixture, 50.7 g. $Al[SC_2H_4N(C_2H_5)_2]_3$ dissolved in 250 ml. tetrahydrofurane was added dropwise over a period of 45 minutes. Upon treatment of the reaction mixture as described in Example V, 53.79 g. of $$NaAlH_2[SC_2H_4N(C_2H_5)_2]_2$$

was obtained, i.e., 96.41% of the theory.

The amino mercaptane required was prepared from $(C_2H_5)_2NCH_2CH_2Cl$ via the thiouronian salt. The $$(C_2H_5)_2NCH_2CH_2SH$$

thus obtained was used in the preparation of $$Al[SCH_2CH_2N(C_2H_5)_2]_3$$

from aluminum hydride and tetrahydrofurane in the same manner as described in Example XVI.

EXAMPLE XIX

The same apparatus as described in Example V was charged with 5.6 g. $Na_3AlH_6$ (91.1%), and 100 ml. tetrahydrofurane. The reaction mixture was refluxed under dropwise addition of a solution of 144.4 g.

$$NaAl(SC_4H_8SC_2H_5)_4$$

in 500 ml. tetrahydrofurane. Upon treatment of the reaction mixture as described in Example V, 145 g.

$$NaAlH(SC_4H_8SC_2H_5)_3$$

was obtained, i.e., 97.06% of the theory.

The necessary mercaptane was prepared from $$BrCH_2CH_2CH_2CH_2Br$$

by substitution of the bromine atoms with SH groups via thiouronian salt. The $SH(CH_2)_4SH$ thus obtained was converted into its sodium salt by reaction with sodium hydride in boiling toluene; the salt was alkylated with ethyl bromide also in toluene. The $C_2H_5S(CH_2)_4SH$ thus obtained was used in the preparation of the complex mercaptide starting from sodium aluminum tetrahydride. The reaction was carried out in tetrahydrofurane under reflux with theoretical amounts of the reactants according to the following equation:

$$NaAl_4 + 4C_2H_5S(CH_2)_4SH \rightarrow NaAl[S(CH_2)_4SC_2H_5]_4 + 4H_2$$

The thus prepared solution was used directly (subsequent to analysis and adjustment of the concentration) in the preparation of the respective organically substituted sodium aluminum hydride of this example.

EXAMPLE XX

The same apparatus as described in Example V was charged with 5.6 g. $Na_3AlH_6$ (91.1%) and 100 ml. tetrahydrofurane. The reaction mixture was refluxed under dropwise addition of a solution of 33.9 g.

$$Al[SC_2H_4N(CH_3)_2]_3$$

in 20 ml. tetrahydrofurane for a period of 45 minutes. Upon treatment of the reaction mixture as described in Example V, 37.8 g. $NaAlH_2[SC_2H_4N(CH_3)_2]_2$ was obtained, i.e., 96.9% of the theoretical yield. The required aminomercaptane was prepared from $$(CH_3)_2NCH_2CH_2Cl$$

via the thiouronian salt. By the procedure described in the Example XVIII, the compound (CH₃)₂NC₂H₄SH was converted into the aluminum mercaptide

Al[SC₂H₄N(CH₃)₂]₃

EXAMPLE XXI

The same apparatus as described in Example V was charged with 63 g. NaAlH[OC₂H₄N(CH₃)₂]₃ and 250 ml. benzene. The reaction mixture was refluxed under dropwise addition of 14 g. benzoyl chloride for 30 minutes; subsequently, 50 ml. benzene was added and the reaction mixture was refluxed for additional 2 hours and, subsequent to cooling, hydrolysis, and addition of HCl, 9.75 g. of benzyl alcohol was isolated, i.e., 90.16% of the theory.

EXAMPLE XXII

The same apparatus as described in Example V was charged with 55.2 g. NaAlH[OCH₂CH₂OCH₃]₃ and 200 ml. benzene. The reaction mixture was refluxed under addition of 15 g. ethyl benzoate with 50 ml. benzene for a period of 30 minutes. After an additional 2 hours of refluxing, the mixture was cooled, and hydrolysis and isolation yielded 8.76 g. benzyl alcohol, i.e., 81% of the theory.

EXAMPLE XXIII

In a similar manner to Example XXII, the following compounds were reduced under substantially the same reaction conditions, and with the same solvents molar concentrations and molar ratios of the reactants:

| Starting compound | Product | Reaction time in hours | yield; percent |
|---|---|---|---|
| (CH₃CO)₂O | C₂H₅OH | 2 | 91.2 |
| n-C₃H₇COOC₂H₅ | C₄H₉OH | 2 | 89.0 |
| C₂H₅COON(CH₃)₂ | C₃H₇OH | 4 | 62.8 |

The procedure, however, is not limited to the use of the compounds given above. Under the same conditions any other compound of the type NaAlH$_x$Q$_{4-x}$ may be used as for example NaAlH₂(OCH₂CH₂OCH₃)₂

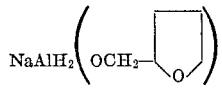
NaAlH₂(OCH₂—⟨O⟩)

or NaAlH₃[OCH₂OCH₂OCH₃].

To reduce 1 g. mol of a compound containing one single carbonyl group (—CH=O or —CO—) into the respective alcohol the theoretically necessary amount of NaAlHQ$_{4-x}$ is equal to 1/x gram mole of NaAlH$_x$Q$_{4-x}$; to reduce one gram mole of a compound containing one single carboxyl group in the molecule the amount necessary of the compound NaAlH$_x$Q$_{4-x}$ is equal to 2/x gram mole of NaAlH$_x$Q$_{4-x}$.

EXAMPLE XXIV

In an apparatus as described in Example V, a suspension of 5.6 g. trisodium aluminum hexahydride of 91.1% purity in 250 ml. of benzene was prepared. The suspension was heated to boiling and a solution of 37.2 g.

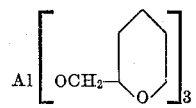
Al[OCH₂—⟨O⟩]₃ in 80 ml. benzene was added dropwise over a period of 30 minutes. By the method of Example V, 39.8 g. of

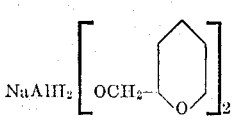
NaAlH₂[OCH₂—⟨O⟩]₂ was obtained, which corresponds to 94% of the theory.

The starting

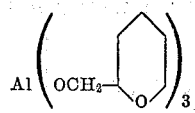
Al(OCH₂—⟨O⟩)₃ was prepared by reacting aluminum methylate with a solution of

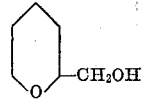
⟨O⟩—CH₂OH in toluene as a solvent, in which solution toluene and

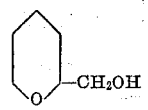
⟨O⟩—CH₂OH were present in a ratio of 1:1; the said

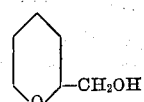
⟨O⟩—CH₂OH was used in an excess which corresponds to 150% of the theoretical amount needed. In accordance with Equation 1, methylalcohol was stripped off from the reaction mixture in a rectification column; subsequently, toluene was stripped off at atmospheric pressure and, finally, the excess of

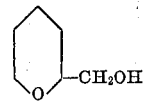
⟨O⟩—CH₂OH was stripped off in a partial vacuum at a temperature of up to 150° C. The product was a non-distillable, highly viscous matter, intermiscible with benzene, toluene, and ethers in any ratio.

EXAMPLE XXV

In the same apparatus as in Example V, a suspension of 5.6 g. trisodium aluminum hexahydride of 91.1% purity in 250 ml. benzene was prepared. The suspension was refluxed and a solution of 33.3 g.

Al[OCH₂CH₂CH₂N(CH₃)₂]₃ in 80 ml. benzene added during a period of 30 minutes. In the same manner as described in Example V, 36.7 g. of NaAlH₂[OCH₂CH₂CH₂N(CH₃)₂]₂ was obtained.

To prepare the starting reactant first (CH₃)₂NCH₂CH₂CH₂OH had to be prepared from HOCH₂CH₂CH₂NH₂ by the conventional reaction with formaldehyde and formic acid; Al[OCH₂CH₂CH₂N(CH₃)₂]₃ was then prepared from (CH₃)₂NCH₂CH₂CH₂OH in the same manner as described in Example XXIV. The former compound is a highly viscous non-distillable liquid, intermiscible with benzene, toluene and ethers in any ratio.

EXAMPLE XXVI

In the apparatus described in Example V, a suspension of 5.6 g. trisodium aluminum hexahydride of 91.1% purity in 250 ml. of benzene was prepared. The suspension was refluxed and a solution of 55.5 g.

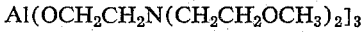
Al(OCH₂CH₂N(CH₂CH₂OCH₃)₂)₃ in 80 ml. benzene was added dropwise over a period of 30 minutes. In the same manner as described in Example V, 59.4 g. of NaAlH₂[OCH₂CH₂N(CH₂CH₂OCH₃)₂]₂ was obtained, i.e., 94.7% of the theory To prepare the starting reactant, first

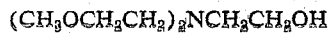
(CH₃OCH₂CH₂)₂NCH₂CH₂OH had to be prepared according to the following equations:

$$N(CH_2CH_2OH)_3 + NaH \rightarrow$$
$$NaOCH_2CH_2N(CH_2CH_2OH)_2 + NaH + H_2$$

$$NaOCH_2CH_2N(CH_2CH_2OH)_2 + NaH + 2(CH_3O)_2SO_2 \rightarrow$$
$$(CH_3OCH_2CH_2)_2NCH_2CH_2OH + H_2 + 2CH_3OSO_2ONa$$

To a refluxing suspending of sodium hydride in xylene (200 ml. of xylene per 1 gram mol sodium hydride), $$Na(CH_2CH_2OH)_3$$

was added dropwise under stirring, and heating was prolonged until evolution of hydrogen had substantially stopped. Subsequently $(CH_3O)_2SO_2$ was added under the same conditions, and the refluxing was resumed and continued under the evolution of hydrogen terminated. The mixture was allowed to cool and 100 ml. of a 60% water solution of potassium hydroxide added per one gram mol of $(CH_3O)_2SO_2$ used. Then, the reaction mixture was filtered, the solid phase washed with xylene and from the xylene solutions $HOCH_2CH_2N(CH_2CH_2OCH_3)_2$ was extracted with water, neutralized and slightly acidified with hydrochloric acid. The hydrochloride obtained was isolated by evaporation of water in vacuo, and the base was set free by addition of a 70% water solution of potassium hydroxide which was added in a slight excess not higher than 10% over the theoretically required amount. The mixture was stirred with diethyl ether and the precipitated potassium chloride was filtered off. The product $$(CH_3OCH_2CH_2)_2NCH_2CH_2OH$$

was obtained from the ethereal solution by distillation and converted into its aluminate in the same manner as described in Example XXIV.

EXAMPLE XXVII

In the apparatus described in Example V, a suspension of 5.6 g. of $Na_3AlH_6$ of 91.1% purity was prepared in 250 ml. benzene. The suspension was refluxed, and a solution of 72.3 g. $Al[OCH_2CH_2N(CH_2CH_2CH_2CH_2OCH_3)_2]_3$ in 120 ml. benzene added dropwise over a period of 30 minutes. In the same way as described in Example V, 72.1 g. of $NaAlH_2[OCH_2CH_2N(CH_2CH_2CH_2CH_2OCH_3)_2]_2$ was obtained which corresponds to 93.2% of the theory.

The starting amino alcohol was prepared from $$HOCH_2CH_2NH_2$$

by alkylation of $CH_3OCH_2CH_2CH_2CH_2Cl$. The latter compound was prepared by methylation of the hydroxyl group in 1,4-butane diol and by subsequent conversion of the second hydroxyl group into chloride by reaction with thionyl chloride. The necessary $$[(CH_3OCH_2CH_2CH_2CH_2)_2NCH_2CH_2O]_3Al$$

was prepared in the manner described in Examples I and XXIV.

EXAMPLE XXVIII

In the apparatus described in Example V, a suspension of 5.6 g. of trisodium aluminum hexahydride (0.05 mol) of 91.1% purity was prepared in 250 ml. benzene. The suspension was refluxed and a solution of 38.4 g. of $Al[OCH(CH_2OCH_3)_2]_3$ in 80 ml. benzene was added over a period of 30 minutes. In the same manner as described in Example V, 55.6 g. of $$NaAlH_2[OCH(CH_2OCH_3)_2]_2$$

was obtained, which corresponds to 95% of the theory.

The starting $(CH_3OCH_2)_2CHOH$ was prepared from glycerol by methylation of two hydroxyl groups by reaction with sodium hydride and $(CH_3O)_2SO_2$ in a similar manner as described in Example XXVI. The ether alcohol obtained was used in the reaction with aluminum methoxide to prepare the starting $Al[OCH(CH_2OCH_3)_2]_3$ in the manner described in Example V.

EXAMPLE XXIX

In the apparatus described in Example V, a suspension was prepared of 5.6 trisodium aluminum hexahydride of a 91.1% purity in 200 ml. tetrahydrofurane. Under the conditions described in Example V, a solution of 20.4 g. of $(n-C_3H_7O)_3Al$ in 200 ml. tetrahydrofurane was added. Identical procedure as described in Example V afforded 24.1 g. of $NaAlH_2[O(n-C_3H_7)]_2$, i.e., 94.3% of the theory.

EXAMPLES XXX TO XL

In the apparatus described in Example V, and under the same conditions as described therein, further compounds of the formula $NaAlHQ_3$ were synthetized according to the equation

(18) $\quad NaAlH_4 + 3NaQ + 3AlQ_3 \rightarrow 4NaAlHQ_3$ wherein the different radicals Q are defined in the Table 1 below.

In the apparatus described in Example V, a suspension was prepared of 2.75 g. of sodium aluminum tetrahydride (0.05 mol) of a 98.2% purity and of 0.15 mol alcoholate of the type NaQ wherein Q again has the several meanings listed in the table below. The reaction medium was 200 ml. benzene. The reaction mixture was refluxed at ambient pressure and a solution of 1.15 mol of $AlQ_3$ in 100 ml. benzene was added dropwise across a period of 30 minutes. The reaction mixture was refluxed for an additional 4 hours. Upon cooling to 15° C., the clear solution was filtered off and the solid residue containing mostly starting materials and impurities was washed with benzene stripped off from the filtrate. From the clear solution obtained benzene was distilled off and the collected product was dried in vacuo at 100° C. and 0.1 mm. Hg.

The yields in gram and percent obtained with respect to the different specific reactants of Examples XXX to XL are also indicated in Table 1.

TABLE 1

| | Starting compounds | | | | Product yield | |
|---|---|---|---|---|---|---|
| Example | NaAlH₄ in g. | Q | NaQ in g. | AlQ₃ in g. | NaAlHQ₃ in g. | Percent |
| XXX | 2.75 | CH₃O(CH₂)₂O— | 14.7 | 37.8 | 52.1 | 96.5 |
| XXXI | 2.75 | C₂H₅O(CH₂)₃O— | 16.8 | 44.1 | 59.8 | 94.1 |
| XXXII | 2.75 | CH₃O(CH₂)₃O— | 16.8 | 44.1 | 60.4 | 95.0 |
| XXXIII | 2.75 | C₂H₅O(CH₂)₃O— | 18.9 | 50.4 | 68.5 | 95.1 |
| XXXIV | 2.75 |  —CH₂O— | 18.6 | 49.5 | 67.6 | 95.5 |
| XXXV | 2.75 |  —CH₂O— | 20.7 | 55.8 | 74.4 | 94.4 |
| XXXVI | 2.75 | (CH₃)₂N(CH₂)₂O— | 16.7 | 43.7 | 60.5 | 96.1 |
| XXXVII | 2.75 | (C₂H₅)₂N(CH₂)₂O— | 20.9 | 56.3 | 64.9 | 95.7 |
| XXXVIII | 2.75 | (CH₃OCH₂CH₂)₂N(CH₂)₂O— | 22.4 | 60.8 | 61.2 | 94.6 |
| XXXIX | 2.75 | (CH₃O CH₂)₂CHO— | 21.3 | 57.6 | 78.3 | 96.1 |
| XL | 2.75 | CH₃O(CH₂)₂O(CH₂)₂O— | 21.3 | 57.6 | 76.1 | 93.2 |

EXAMPLES XLI TO XLIII

In the apparatus described in Example V, and under the same conditions as described in Examples XXX to XL, further compounds of the formula NaAlH$_2$Q$_2$ were synthesized according to the equation:

(19)     Na$_3$AlH$_6$ + 2AlQ$_3 \rightarrow$ 3NaAlH$_2$Q$_2$ wherein the different radicals Q are defined in the Table 2 below.

The starting material used were throughout all the Examples 5.6 g. of Na$_3$AlH$_6$ (0.05 mol) of 91.1% purity in 250 ml. benzene and 0.1 mol AlQ$_3$ in 100 ml. benzene.

The yields in grams and percent obtained with respect to the different specific reactants of Examples XLI to XLIII are also indicated in Table 2.

TABLE 2

| Example | Starting compounds | | | Product yield | |
|---|---|---|---|---|---|
| | Na$_3$AlH$_6$ in g. | Q | AlQ$_3$ in g. | NaAlH$_2$Q$_2$ in g. | Percent |
| XLI | 5.6 | C$_2$H$_5$O(CH$_2$)$_2$O— | 29.4 | 32.7 | 94.7 |
| XLII | 5.6 | C$_2$H$_5$O(CH$_2$)$_3$O— | 33.6 | 36.9 | 95.3 |
| XLIII | 5.6 | 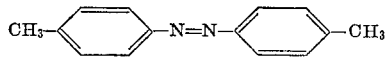 | 33.0 | 35.4 | 93.0 |

EXAMPLE XLIV

Into a pressure vessel of 2.5 l. volume were charged 23 g. of sodium (1 mole), 33 g. of aluminum powder (of 95% purity, containing 5% aluminum oxide), 400 ml. toluene and 9.2 g. of NaAlH$_2$[O(CH$_2$)$_2$N(CH$_3$)$_2$]$_2$ equal to 16% by weight of the latter with respect to the amount of sodium and aluminum used. Hydrogen was introduced into the pressure vessel to establish a pressure of 150 atmospheres. The pressure vessel was heated to a temperature of 160 to 170° C. and the pressure therein was kept at the level of 150 atmospheres. The reaction was finished after 4 hours and the pressure vessel cooled and emptied. The solid phase was extracted with tetrahydrofurane which was used in a quantity of 200 milliliters per each 10 grams of NaAlH$_4$ obtained. From the tetrahydrofurane extract 50.1 g. of NaAlH$_4$ was obtained subsequent to evaporation, i.e., 92.6% of the theory.

As to the catalyst used and as to the amount of the latter applied conditions were maintained as described in Example III. The optimum temperature range lies between 150 and 170° C. At temperatures below 150° C. the reaction is too slow or it does not proceed at all. At temperatures above 170° C. trisodium aluminum hexahydride is obtained as a by-product. It is also possible to work with stoichiometric amounts of sodium and aluminum; an excess on aluminum, however, is more advantageous (from 10 to 50%) so as to avoid excessive formation of trisodium aluminum hexahydride.

EXAMPLE XLV

In the apparatus described in Example V, a solution of 13.4 g. of p-CH$_3$C$_6$H$_4$NO$_2$ in 100 ml. benzene was added dropwise across a period of 30 minutes to a refluxing solution of 40.4 g. of NaAlH$_2$[O(CH$_2$)$_2$OCH$_3$]$_2$ (0.2 mole) in 200 ml. benzene. The mixture was refluxed for one additional hour and, subsequently to cooling to 20° C., 200 ml. water was added and the mixture was neutralized with theoretical amounts of sulfuric or hydrochloric acid. The solution was filtered, the benzene layer removed and 9.4 g. of the compound

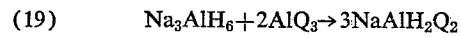

was obtained subsequently to evaporation of benzene. The yield was 92% of the theory.

With the same result, any of the other compounds of the formulae NaAlH$_x$Q$_{4-x}$, e.g., NaAlH$_2$[O(CH$_2$)$_2$N(CH$_3$)$_2$]$_2$

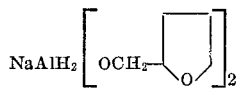

may be used.

EXAMPLE XLVI

Into a pressure vessel of 1.5 l. volume a solution of 67 g. of NaAlH$_2$[O(CH$_2$)$_2$OCH$_3$]$_2$ (0.33 mol.) in 500 ml. of benzene was charged and a sealed glass ampulla containing 27.1 g. of SiHCl$_3$ (0.2 mole) and 5 steel balls of a diameter of 30 mm. were inserted into the vessel. The pressure vessel was closed, flushed three times with nitrogen introduced at a pressure of 20 atmospheres, and the nitrogen discharged. By a sudden rotation of the pressure vessel the ampulla was broken. A spontaneous reaction took place and the pressure rose to 5 atmospheres. The contents of the pressure vessel were emptied into a gas holder and by analysis it was determined that 4.8 l. (20° C.) of silicon hydride SiH$_4$ was obtained, i.e., 96% of the theory. The other compounds of the general formula NaAlH$_x$Q$_{4-x}$ which are mentioned in Example XLX may also be used and will give similar results.

EXAMPLE XLVII

Under conditions identical with those described in Example XLVI, the reaction of 34 g. of silicon tetrachloride (0.2 mole) with 90 g. of NaAlH$_2$[O(CH$_2$)$_2$OCH$_3$]$_2$ (0.44 mole) in 500 ml. benzene was carried out. The reaction afforded 4.6 l. (20° C.) of silicon hydride, SiH$_4$, i.e., 92% of the theory. Other compounds of the formula NaAlH$_x$Q$_{4-x}$ may be used in a similar manner and with the same result.

EXAMPLE XLVIII

Under conditions identical to those of Example XLVI, the reaction of 21 g. SiF$_4$ (0.2 mole) with 90 g.

NaAlH$_2$[O(CH$_2$)$_2$OCH$_3$]$_2$ (0.44 mole) in 500 ml. benzene was carried out, giving 4.85 l. of silicon hydride, SiH$_4$, i.e., a yield of 97%. Other compounds of the formula NaAlH$_x$Q$_{4-x}$ may be used in a similar manner and with the same result.

EXAMPLE XLIX

Under conditions identical to those of Example XLVI, the reaction of 30 g. CH$_3$SiCl$_3$ (0.2 mole) with

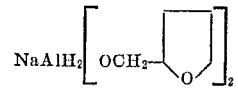

(0.33 mole) in 500 ml. benzene was carried out. The reaction afforded 4.44 l. of CH$_3$SiH$_3$, i.e., 89% of the theory. Other compounds of the formula NaAlH$_x$Q$_{4-x}$ may be used in a similar manner and with the same result.

EXAMPLE L

In the apparatus described in Example V, containing a solution of 33.3 g. of NaAlH$_2$[OCH$_2$CH$_2$OCH$_3$]$_2$ (0.165 mole) in 200 ml. benzene the reaction with 21.1 g. of $C_6H_5SiCl_3$ (0.1 mole) in 150 ml. benzene was carried out. The two solutions were added together over a period of 30 minutes, and thereafter the reaction mixture was refluxed for 30 minutes. In a conventional manner the compound of the formula $C_6H_5SiH_3$ was isolated and 9.3 g. of the said product obtained, i.e. 86% of the theory. Other compounds of the formula $NaAlH_xQ_{4-x}$ may be used in a similar manner and with the same result.

EXAMPLES LI TO LIII

Into a rotary pressure vessel of 1.5 l. working volume, a solution was introduced consisting of 500 ml. benzene having dissolved therein $NaAlH_2[OCH_2CH_2N(CH_3)_2]_2$ in the amounts indicated in Table 3 below. 5 steel balls of a diameter of 30 mm. and a sealed glass ampulla containing the halide the formula of which and the amount of which are given in Table 3 were also inserted into the pressure vessel. The pressure vessel was flushed with hydrogen and the ampulla was caused to break in the manner described in Example XLVI. The pressure vessel was rotated under heating to a temperature of 100° C. at which temperature the rotating vessel was kept for 2 hours. Upon cooling to 20° C., the gas evolved was discharged into a gas receptacle, the volume of the gas determined and the latter identified by means of gas chromatography.

in 300 ml. p-xylene was charged (the amount used of the former compound in the individual Examples LIV to LVI is given in Table 4). Subsequently, the mixture was refluxed under atmospheric pressure. To the refluxing solution was added dropwise across a period of 30 minutes a solution of an aryl halide in 100 milliliters of p-xylene. The aryl halides used and the amounts thereof are also specified in Table 4 below. The reaction mixture was refluxed for an additional 2 hours. Upon cooling to 20° C., 100 ml. water was added, and subsequently, 100 ml. of 20% hydrochlorine acid. The organic layer was quantitatively separated and neutralized by shaking with 5 ml. of a 40% aqueous solution of potassium hydroxide, introduced into a 1 liter measuring flask, and xylene was added up to the required level.

The product was identified, the yield ascertained by means of gas chromatography.

TABLE 4

| | Starting compounds | | | | Product yield | |
|---|---|---|---|---|---|---|
| | $NaAlH_2\left[OCH_2-\underset{O}{\bigcirc}\right]_2$ | | Aryl halide | | | |
| Example | In g. | In gram mol | In g. | In gram mol | Hydrocarbon in g. | Percent |
| LIV | 30.5 | 0.12 | Naphthalene, 50.6 | 0.2 | Naphthalene, 24.8 | 96.8 |
| LV | 30.5 | 0.12 | p-dibromobenzene, 23.6 | 0.1 | Benzene, 7.3 | 93.5 |
| LVI | 45.7 | 0.18 | 1,2,4,5-tetrabromobenzene, 31.5 | 0.1 | Benzene, 7.2 | 92.2 |

EXAMPLE LVII

A pressure vessel of 2.5 l. working volume was charged with 69 g. metal sodium (3 mol.), 28.4 g. of aluminum powder of 90.1% purity (1 mol.), 114 g. of $Na_3AlH_6$ of 89.8% purity (1 mol.), one liter of a xylene solution of 95 g. $NaAlH_2[OCH_2CH_2N(CH_3)_2]_2$, and 1.4 l. of steel balls of 5-mm. diameter. The pressure vessel was closed, flushed thoroughly with hydrogen, evacuated and heated to a temperature of 185 to 190° C. At this temperature,

TABLE 3

| | Starting compounds | | | | Product | |
|---|---|---|---|---|---|---|
| | $NaAlH_2=[OCH_2CH_2N(CH_3)_2]_2$ | | Alkyl halide | | | |
| Example | In g. | In gram mols | In g. | In gram mols | Hydrocarbon liter/20° C. | Percent |
| LI | 141 | 0.5 | $CH_3Cl$, 50.5 | 1 | $CH_4$, 23.5 | 94 |
| LII | 282 | 1 | $C_2H_4Br_2$, 188 | 1 | $C_2H_6$, 23.1 | 92 |
| LIII | 141 | 0.5 | $C_2H_4J$, 156 | 1 | $C_2H_6$, 23.8 | 95 |

EXAMPLES LIV TO LVI

Into the apparatus as described in Example V, a solution of

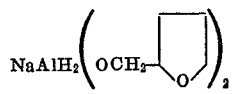

hydrogen was introduced into the vessel, and the partial pressure of hydrogen was kept in a range of between 0.45 to 0.55 atmosphere. When the reaction was finished and the consumption of hydrogen stopped, the presure vessel was cooled, emptied, the balls removed and the suspension obtained was treated in the manner described in Example III. The synthesis afforded 205 g. of a slightly grayish matter containing 191 g. of trisodium aluminum hexahydride which corresponds to a yield of 9.4%.

The addition of trisodium aluminum hexahydride to the reaction mixture prior to the actual synthesis is only of importance for the milling of aluminum which otherwise would not proceed. Another material may be also used for this purpose, any inert material, as for instance aluminum oxide will give the desired result. The final product, however, is then contaminated with the inert material added.

As to the choice of the catalyst, the same will apply as stated in Example III.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adapatations should and are intended to be comprehended within the meaning and range of equivalence of the following claims.

What is claimed as new and desired to be secured by Leters Patent is:

1. A substituted sodium aluminum hydride of the formula $NaAlH_xQ_{4-x}$, wherein $x$ is 1 or 2 and wherein Q is an organic residue derived by splitting off an active hydrogen atom from a compound selected from the ground consisting of:
   (1) ether alcohols of the formula $R'O(CH_2)_zOH$ where R' is alkyl of 1 to 4 carbon atoms and $z$ is an integer from 2 to 4;
   (2) polyether alcohols of the formula $$R'(OCH_2)_nO(CH_2)_zOH$$

wherein $n$ is an integer from 2 to 4 and R' and $z$ have the same meaning as in (1) above;
   (3) an amino alcohol of the general formula $$R''R'''N(CH_2)_zOH$$

wherein R" and R"' are each selected from the group consisting of $RO(CH_2)_z$ and R, and wherein R is selected from the group consisting of alkyl of 1 to 4 carbon atoms and aryl of 6 to 8 carbon atoms, and wherein $z$ has same meaning as in (1) above.

2. The substituted sodium aluminum hydride of claim 1, wherein Q is OR and R is alkoxy-alkyl or t-aminoalkyl, alkyl and alkoxy in these two radicals having from 2 to 4 atoms.

3. The sodium-aluminum hydride of claim 1, which has the formula $NaAlH_2[O(CH_3)_mOR]_2$, wherein R is alkyl having 1 to 4 carbon atoms and $m$ is 2 or 3.

4. The sodium-aluminum hydride of claim 1, which is $NaAl\{[O(CH_2)_m]_wOR\}_2$, wherein R is alkyl having 1 to 4 carbon atoms, $m$ is 2 or 3 and $w$ is an integer from 2 to 4.

5. The sodium-aluminum hydride of claim 1, which is

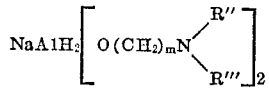

wherein R" and R"' are alkyl having 1 to 4 carbon atoms and $m$ is 2 or 3.

6. A composition as defined in claim 1, wherein said substituted sodium-aluminum hydride is selected from the group consisting of

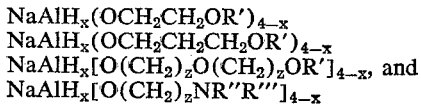

7. A composition as defined in claim 1, wherein said substituted sodium aluminum hydride is selected from the group consisting of

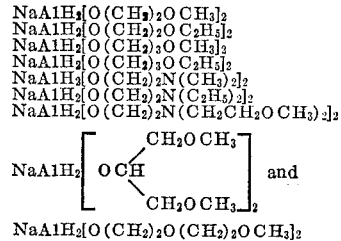
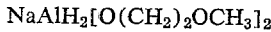
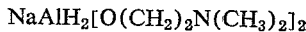

8. A substituted sodium aluminum hydride as defined in claim 7, and having the formula $$NaAlH_2[O(CH_2)_2OCH_3]_2$$

9. A substituted sodium aluminum hydride as defined in claim 7, and having the formula $$NaAlH_2[O(CH_2)_3N(CH_3)_2]_2$$

10. A new composition of matter as defined in claim 1, wherein said substituted sodium aluminum hydride is selected from the group consisting of

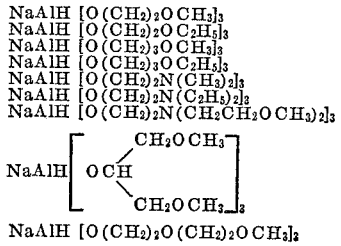

References Cited

UNITED STATES PATENTS

| | | | |
|---|---|---|---|
| 2,494,968 | 1/1950 | Schlesinger et al. | 260—462 |
| 3,147,272 | 9/1964 | Brown et al. | 260—448 X |
| 3,184,492 | 5/1065 | Cole | 260—448 |
| 3,060,216 | 10/1962 | Hamprecht et al. | 260—448 |
| 3,281,443 | 10/1966 | Hunt | 260—448 |
| 3,394,158 | 7/1968 | Chini et al. | 260—448 |

TOBIAS E. LEVOW, Primary Examiner

H. M. S. SNEED, Assistant Examiner

U.S. Cl. X.R.

23—365; 252—431 R, 431 N; 260—327 R, 347.8, 345.9, 332.3 R